United States Patent
Wendt et al.

(10) Patent No.: US 9,941,786 B2
(45) Date of Patent: Apr. 10, 2018

(54) POLARITY CORRECTION CIRCUIT

(71) Applicant: PHILIPS LIGHTING HOLDING B.V., Eindhoven (NL)

(72) Inventors: Matthias Wendt, Eindhoven (NL); Leenart Yseboodt, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/508,041

(22) PCT Filed: Aug. 27, 2015

(86) PCT No.: PCT/EP2015/069668
§ 371 (c)(1),
(2) Date: Mar. 1, 2017

(87) PCT Pub. No.: WO2016/034495
PCT Pub. Date: Mar. 10, 2016

(65) Prior Publication Data
US 2017/0288535 A1 Oct. 5, 2017

Related U.S. Application Data
(60) Provisional application No. 62/046,334, filed on Sep. 5, 2014.

(30) Foreign Application Priority Data

Oct. 20, 2014 (EP) .................................. 14189483

(51) Int. Cl.
*H02M 7/08* (2006.01)
*H02M 3/155* (2006.01)
(Continued)

(52) U.S. Cl.
CPC ............... *H02M 3/155* (2013.01); *H02J 1/00* (2013.01); *H04L 12/10* (2013.01)

(58) Field of Classification Search
CPC .. H02M 7/1552; H02M 7/162; H02M 7/1623; H02M 7/1626; H02M 7/17; H02M 7/2173; H02M 7/219; H02M 7/23
(Continued)

(56) References Cited

U.S. PATENT DOCUMENTS 5,963,441 A * 10/1999 Gibbs .................... H02M 7/17
363/128
7,921,314 B2 4/2011 Schindler et al.
(Continued)

FOREIGN PATENT DOCUMENTS

EP 2728793 A2 5/2014
GB 2477864 A 8/2011

OTHER PUBLICATIONS

H. Wu, et al., "50W Power Device (PD) Power in Power Over Ethernet (PoE) System with Input Current Balance in Four-Pair Architecture with Two DC/DC Converters", College of Electrical Eneingering, Zhejiang University, Hangzhou, 310027, PR China, IEEE, 2010, pp. 575-579.

*Primary Examiner* — Alex Torres-Rivera

(57) ABSTRACT

A power unbalance mitigating polarity correction circuit is presented comprising a first and a second polarity correction circuit, each comprising: an input for receiving an input current, an output for providing a rectified output current, at least a first current path, for conducting the received current when the received current is of a first polarity, and a second current path, for conducting the received current when the received current is of a second polarity, wherein the first current path comprises a passive rectification component as an asymmetric conductance component of a first type and the second current path comprises an active rectification (Continued)

component as an asymmetric conductance component of a second type different from the first type; the power unbalance mitigating polarity correction circuit further comprising a controller, wherein the controller is arranged for controlling the active rectification component to operate in a power unbalance mitigation mode when the current received by the first polarity correction circuit is conducted over the first current path of the first polarity correction circuit and the current received by the second polarity correction circuit is conducted over the second current path of the second polarity correction circuit.

9 Claims, 7 Drawing Sheets

(51) Int. Cl.
*H04L 12/10* (2006.01)
*H02J 1/00* (2006.01)

(58) Field of Classification Search
USPC .................................. 363/67, 69, 70, 84, 88
See application file for complete search history.

(56) References Cited

U.S. PATENT DOCUMENTS

| | | |
|---|---|---|
| 8,132,027 B2 | 3/2012 | Blaha et al. |
| 8,669,752 B2 | 3/2014 | Schindler |
| 2006/0215680 A1 | 9/2006 | Camagna |
| 2007/0170903 A1 | 7/2007 | Apfel |
| 2007/0208961 A1 | 9/2007 | Ghoshal et al. |
| 2007/0283173 A1 | 12/2007 | Webb et al. |
| 2012/0212209 A1 | 8/2012 | Schindler |
| 2012/0242390 A1 | 9/2012 | Montalbo et al. |
| 2013/0093444 A1 | 4/2013 | Maniktala et al. |
| 2013/0307427 A1* | 11/2013 | Liang ............. H05B 37/02 363/67 |
| 2014/0129850 A1 | 5/2014 | Paul |
| 2014/0164795 A1 | 6/2014 | Wright et al. |
| 2014/0203651 A1* | 7/2014 | Ku ................. H02J 1/102 307/80 |

* cited by examiner

POLARITY CORRECTION CIRCUIT

CROSS-REFERENCE TO PRIOR APPLICATIONS

This application is the U.S. National Phase application under 35 U.S.C. § 371 of International Application No. PCT/EP2015/069668, filed on Aug. 27, 2015, which claims the benefit of European Patent Application No. 14189483.2, filed on Oct. 20, 2014, and U.S. Provisional Application No. 62/046,334, filed Sep. 5, 2014. These applications are hereby incorporated by reference herein.

FIELD OF THE INVENTION

The present invention relates to a polarity correction circuit, a power unbalance mitigating polarity correction circuit, a Power over Ethernet compliant Powered Device, a Power over Ethernet power distribution system, a method for operating a controller in a power unbalance mitigating polarity correction circuit, a computer program product and a power unbalance mitigating polarity correction circuit controller.

BACKGROUND OF THE INVENTION

In Power-over-Ethernet (PoE) system in accordance with the PoE standard IEEE 802.3 af or IEEE 802.3 at and/or related standards, a power providing device (power providing equipment; PSE) provides a power to one or several powered devices (PD) via one or several electrical conductors (Ethernet cables). The power providing device is, e.g., a switch and the powered devices are, e.g., security cameras, wireless access points, voice over internet protocol (VoIP) telephones, etc. In accordance with the PoE standard, the PSE provides power over the pins of the output port (i.e. modular jack) according to an Alternative A configuration or an Alternative B configuration. The Ethernet cable used can be a straight type cable or a cross type cable. The polarity configuration on the side of the PD can therefore vary and as such, the PD comprises a polarity correction circuit to rectify the direct current (DC) power it receives. An example of a polarity correction circuit can be found in US patent publication 2012/212209 A1. Typical bridge rectifiers are a tradeoff between at least cost of the bridge rectifier and power efficiency of the bridge rectifier. There is a need for an improved polarity correction circuit.

SUMMARY OF THE INVENTION

Inventors have realized that in a power distribution system, such as a PoE power distribution system, although the polarity configuration of incoming power can vary, there can be a polarity configuration that, in practice, occurs more often than others. In a PoE power distribution system for example, the configuration according to which the PSE provides current over the pins of the output port can be fixed in a future PoE standard. Although the polarity configuration of the current received on the side of the PD can still vary based on the cable type used, the majority of the cables used in installations of PoE power distribution systems are straight type cables. As such, the far majority of PD will receive current from a PSE according to a known polarity, yet the PD should still be able to operate if the polarity is different due to, for example, the use of a cross type cable instead of a straight type cable.

It is an object of the present invention to provide a power unbalance mitigating polarity correction circuit comprising a polarity correction circuit, a Power over Ethernet compliant Powered Device comprising the power unbalance mitigating polarity correction circuit and a Power over Ethernet power distribution system comprising the Powered Device. It is a further object of the invention to provide a method for operating a controller in a power unbalance mitigating polarity correction circuit, a computer program product implementing the method and a power unbalance mitigating polarity correction circuit controller arranged for executing the computer program product.

In a first aspect of the present invention, a polarity correction circuit comprised in the power unbalance mitigating polarity correction circuit comprising is presented. The polarity correction circuit comprises: an input for receiving an input current, an output for providing a rectified output current, at least a first current path, for conducting the received current when the received current is of a first polarity, and a second current path, for conducting the received current when the received current is of a second polarity, wherein the first current path comprises an asymmetric conductance component of a first type and the second current path comprises an asymmetric conductance component of a second type different from the first type. When this polarity correction circuit is used in an implementation where in the majority of cases the received current is of a first polarity and a minority of the cases the received current is of a second polarity, then the asymmetric conductance component of the first type can be selected to be efficient (or more efficient), yet costly (or more costly) and the asymmetric conductance component of the second type can be selected to be inefficient (or less efficient), yet cheap (or less costly), to obtain a polarity correction circuit that in most implementations will be both efficient and less costly than a traditional polarity correction circuit comprising only asymmetric conductance components of the first type. Although in the example provided here, (electrical) efficiency and cost are the trade-offs, various other factors can be part of a trade-off where the polarity correction circuit according to the invention is beneficial over traditional polarity correction circuits, such factors can include heat dissipation, form factor, reliability, complexity, environmental friendliness, RoHS or standards compliance, etc.

The polarity correction circuit can, for example, receive direct current as input current over two wires (a configuration with one negative and one positive polarity), yet in other embodiments the polarity correction circuit can receive current over more than two wires (a configuration with one or more negative and one or more positive polarities).

The asymmetric conductance component of a first type is a passive rectification component and the asymmetric conductance component of a second type is an active rectification component. This embodiment is especially beneficial as an active rectification component is in general much more energy efficient than, for example, a typical p-n junction diode.

Continuing this first aspect of the invention, a power unbalance mitigating polarity correction circuit is provided. The power unbalance mitigating polarity correction circuit comprises at least a first and a second polarity correction circuit according to the first aspect of the invention and further comprises a controller, wherein the controller is arranged for controlling the active rectification component to operate in a power unbalance mitigation mode when the current received by the first polarity correction circuit is conducted over the first current path of the first polarity correction circuit and the current received by the second polarity correction circuit is conducted over the second current path of the second polarity correction circuit. When two or more polarity correction circuits according to the first aspect of the invention are used to power a load, it can occur that current over one of the polarity correction circuits follows a current path comprising a less energy efficient asymmetric conductance component than the asymmetric conductance component comprised in the current path of the other polarity correction circuit, thereby causing a power unbalance. Thus it is beneficial if a circuit comprising two or more polarity corrections according to the first aspect of the invention is arranged to mitigate power unbalance when it occurs.

In an embodiment of the power unbalance mitigating polarity correction circuit according to the invention, the asymmetric conductance component of a first type is a diode and the asymmetric conductance component of the second type is a MOSFET, and wherein in the power unbalance mitigation mode the controller controls the MOSFET such that current flows through the body diodes of the MOSFET. In this advantageous embodiment, the controller can turn off the MOSFET such that the current flows through the body diode of the MOSFET. This causes an energy inefficiency comparable to the energy inefficiency of the asymmetric conductance component of the first type, thereby (at least partially) mitigating the power unbalance.

In a further embodiment of the power unbalance mitigating polarity correction circuit according to the invention, the controller is further arranged for determining a power unbalance level and for controlling the MOSFET in the power unbalance mitigation mode when the determined power unbalance level exceeds a predetermined threshold. A power unbalance can be acceptable to certain load types and as such, in this advantageous embodiment, a predetermined threshold for a power unbalance level determines whether or not the MOSFET is controlled in the power unbalance mitigation mode. If the power unbalance mitigation mode creates an energy inefficiency, this inefficiency then only occurs when the power unbalance would otherwise be unacceptable (as determined by the threshold).

In another embodiment of the power unbalance mitigating polarity correction circuit according to the invention, the controller is further arranged for determining a current level drawn over the output and control the MOSFET in the power unbalance mitigation mode when the determined current level exceeds a predetermined threshold. A power unbalance can be acceptable when the current level drawn over the output is below a predetermined threshold, for example when a standard to which the device is compliant prohibits current unbalance only when a load consumes current above a certain level.

In yet another embodiment of the power unbalance mitigating polarity correction circuit according to the invention, the controller is further arranged for controlling the channel resistance of the MOSFET. The MOSFET can be controlled in the linear region to carry current to the extent that unbalance requirements (e.g. as set by a standard) allow.

In another embodiment of the power unbalance mitigating polarity correction circuit according to the invention, the power unbalance mitigating polarity correction circuit further comprises a current limiter arranged for limiting the rectified output current available over the output. In this embodiment the power unbalance mitigating polarity correction circuit can operate to allow for a first maximum rated current when the polarity of the current received is as expected (i.e. the current follows a current path in the first and second polarity correction circuit over the same or similar type of asymmetric conductance component, from the perspective of energy efficiency), but allows for a second, lower, maximum rated current based on the limit set by the current limiter when the polarity of the current received is not as expected (i.e. the current follows a first current path in the first polarity correction circuit comprising a first type of asymmetric conductance component and a second current path in the second polarity correction circuit comprising a second type of asymmetric conductance component, thereby causing a power unbalance).

In a second aspect of the invention, a Power over Ethernet, PoE, compliant Powered Device, PD, is provided. The PD comprises the power unbalance mitigating polarity correction circuit according to the second aspect of the invention. The PoE standard requires a PD to be able to work with a variety of polarity to pin configurations for receiving power as well as with a variety of cable configurations (e.g. straight type cables and cross type cables). Certain configurations (or combinations of configurations) occur more frequently in PoE power distribution system implementations than others. As such a typical PD is, to some extent, over dimensioned (e.g. the polarity correction circuit used comprises all MOSFETs). A PD comprising the power unbalance mitigating polarity correction circuit can therefore allow for a tradeoff between, for example, (energy) efficiency and cost in relation to the various polarity configurations.

In a third aspect of the invention, a PoE power distribution system, comprising the PD according to third aspect of the invention, is provided. The PoE power distribution system further comprises a Power Sourcing Equipment, PSE, wherein the PSE is arranged for providing current, through a port, according to a predetermined polarity configuration. In a future PoE standard, the PSE can be required to provide a single polarity to pin configuration such that ports of all compliant PSEs provide a predetermined polarity over each pin. In an implementation of a PoE power distribution system according to such a future PoE standard, an installer can still use a cross type cable when typically a straight type cable is used.

In a fourth aspect of the invention, a method for operating a controller in a power unbalance mitigating polarity correction circuit comprising at least a first and a second polarity correction circuit according to the first aspect of the invention is provided. The method comprises: determining the polarity of the current received over the input of the first polarity correction circuit, determining the polarity of the current received over the input of the second polarity correction circuit, controlling the active rectification component of the second polarity correction circuit to operate in a power unbalance mitigation mode when the current received over the input of the first polarity correction circuit is of a first polarity and the current received over the input of the second polarity correction circuit is of a second polarity.

In a fifth aspect of the invention, a computer program product comprising instructions for causing a processor to perform the method according to the fifth aspect of the invention is provided.

In a sixth aspect of the invention, a power unbalance mitigating polarity correction circuit controller is provided. The power unbalance mitigating polarity correction circuit controller comprises a processor, a memory and an interface arranged for interfacing with at least a first and a second polarity correction circuit, wherein the memory comprises the computer program product according to the sixth aspect of the invention.

It shall be understood that the power unbalance mitigating polarity correction circuit of claim 1, the Power over Ethernet compliant Powered Device of claim 7, the Power over Ethernet power distribution system of claim 8, the method for operating a controller in a power unbalance mitigating polarity correction circuit of claim 9, the computer program product of claim 10 and the power unbalance mitigating polarity correction circuit controller of claim 11 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1:
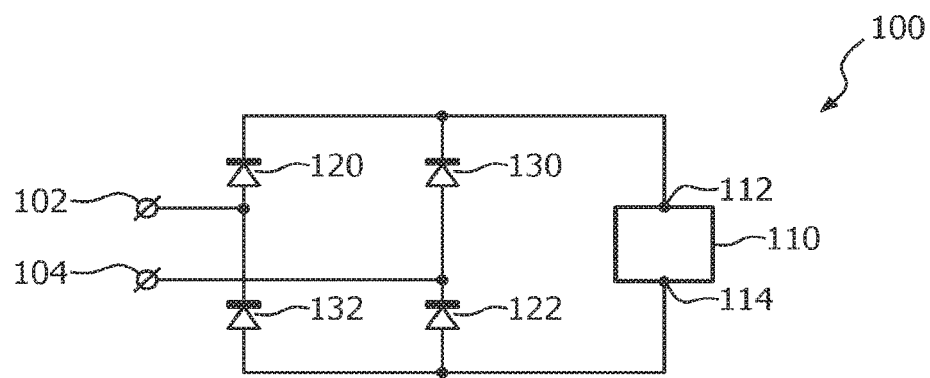
FIG. 1 shows schematically and exemplarily a polarity correction circuit according to the prior art.

FIG. 1 shows an example of a traditional polarity correction circuit 100 as known in the prior art. An input 102, 104 provides rectified current to load 110. Although the polarity over the input 102, 104 can vary, the polarity of the current provided to the load is rectified such that there is a positive output 112 and a negative output 114. Rectification of the current is the result of the use of four diodes of the same type and the chosen circuit architecture, which allows, depending of the polarity, the current to flow through diodes 120, 122 or alternatively 130, 132. There are several options for selecting an asymmetric conductance component, such as the diodes 120, 122, 130, 132 shown in FIG. 1. A few types of asymmetric conductance components are shown in Table 1. Typically, the smaller the power loss (as shown here: the power loss for a typical PoE type 1 PD consuming 15 W), the larger the size, the higher the cost or the greater the complexity of the component. As such, when selecting the asymmetric conductance components for a traditional polarity correction circuit, a trade-off has to be made between such factors.

TABLE 1

| Bridge design | Typical power loss | Size | Cost | Complexity | Example component |
|---|---|---|---|---|---|
| Single package | 600 mW | Small | Low | Low | MB1S Bridge Rectifier |
| Schottky Diode | 240 mW | Medium | High | Medium | SB3100 |
| MOSFET | 23 mW | Medium | High | High | FDS4559-60V |

Figure 2:
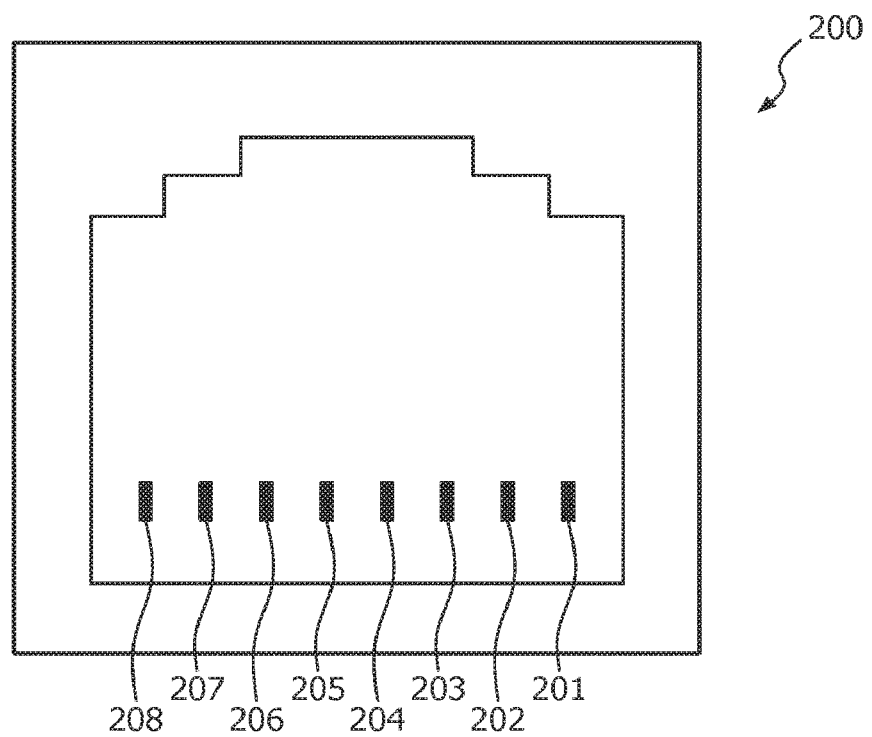
FIG. 2 shows schematically and exemplarily a pin configuration of a 8P8C modular jack used for connecting to an Ethernet cable according to the prior art.
Figure 3A:
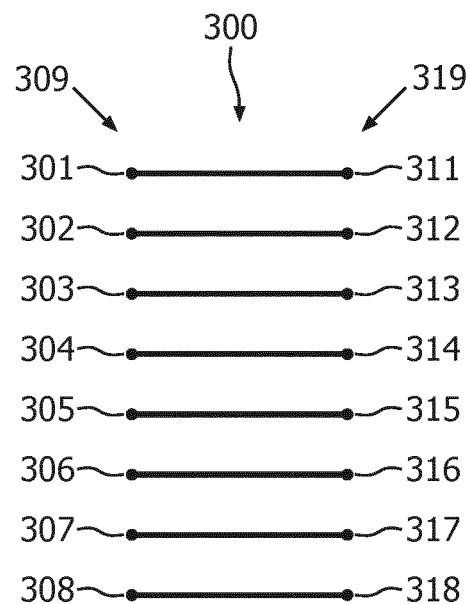
FIG. 3a and FIG. 3b show schematically and exemplarily the pin configuration of respectively a straight type Ethernet cable and a cross type Ethernet cable.
Figure 3B:
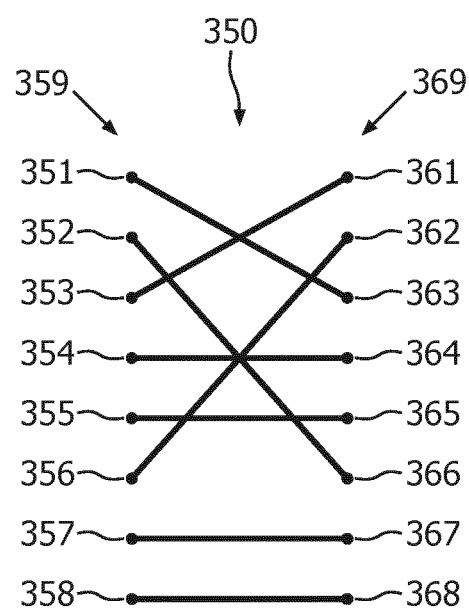

In FIG. 2 a 8P8C type jack 200 is shown as is commonly used for connecting Ethernet cables to ports (e.g. to a port of a PSE on one end and to a port of a PD at the other end, in order to connect the PD to the PSE). There are eight pins 201, 202, 203, 204, 205, 206, 207, 208 that correspond to the four wire pairs in a typical Ethernet cable. FIGS. 3a and 3b respectively show a straight type Ethernet cable pin diagram 300 and a cross type Ethernet cable pin diagram 350. The wires in the straight type Ethernet cable have the same pin configuration at each end 309, 319 and as such pins 301, 302, 303, 304, 305, 306, 307, 308 are connected to pins 311, 312, 313, 314, 315, 316, 317, 318 respectively. Some of the wires in the cross type Ethernet cable connect a different pin at one end than at the other end (the $1^{st}$ and $3^{rd}$ pin; the $2^{nd}$ and $6^{th}$ pin), as such pins 351, 352, 353, 354, 355, 356, 357, 358 are connected to pins 363, 366, 631, 634, 365, 362, 367, 368 respectively.

Figure 4:
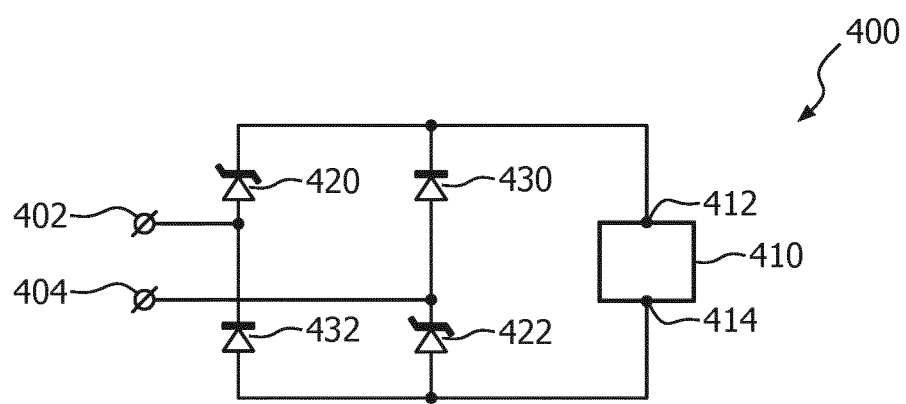
FIG. 4 shows schematically and exemplarily a polarity correction circuit comprising diodes and Schottky diodes.

FIG. 4 shows an example of a polarity correction circuit 400 according to the invention. Current is received through an input 402, 404 and rectified current is provided to a load 410 through an output 412, 414. Although the polarity over the input 402, 404 can vary, the polarity over the output 412, 414 is determined (412 positive polarity versus 141 negative polarity). In this example, two Schottky diodes 420, 422 are used for the first current path and two p-n junction diodes 430, 432 are used for the second current path. Other diodes or active rectification components could be used instead. In this example, when the polarity of the current received over the input 402, 404 is such that the current flows through the Schottky diodes (i.e. 402 positive polarity versus 404 negative polarity), the polarity correction circuit provides more (energy) efficient current rectification than the traditional polarity correction circuit 100 of FIG. 1. At the same time, if the polarity over the input is reversed (i.e. 402 negative polarity versus 404 positive polarity) the polarity correction circuit 400 will rectify the current at the same level of (energy) efficiency as the traditional polarity correction circuit of FIG. 1. As Schottky diodes are typically more expensive than p-n junction diodes, this polarity correction circuit 400 is cheaper than a circuit using four Schottky diodes. In an implementation where the majority of the installations the polarity of the input current is such that input 402 has positive polarity and input 404 negative polarity, then in the majority of the installations this is a more cost effective solution than a polarity correction circuit with four Schottky diodes and a more (energy) efficient solution than the traditional polarity correction circuit 100 of FIG. 1 with four p-n junction diodes.

One implementation where for the majority of the installations the polarity of the current over the input is known, is in a (future) PoE standard. Table 3 shows the pin configuration of a PSE of Type 1 or Type 2 (as defined in the PoE IEEE 802.3 af/at standard) for the various alternatives that are standard compliant (i.e. Alternative A MDI-X, Alternative A MDI and Alternative B). In a future PoE standard a Type 3 PSE can be defined, which has a fixed pin configuration (i.e. there are no alternatives). On the side of the PSE the polarity of the current provided over the pins is then known.

TABLE 3

| Pin | Type 1 or 2 PSE-Alternative A (MDI-X) | Type 1 or 2 PSE-Alternative A (MDI) | Type 1 or 2 PSE-Alternative B | Type 3 PSE |
| --- | --- | --- | --- | --- |
| 1 | Neg | Pos | | Neg |
| 2 | Neg | Pos | | Neg |
| 3 | Pos | Neg | | Pos |
| 4 | | | Pos | Pos |
| 5 | | | Pos | Pos |
| 6 | Pos | Neg | | Pos |
| 7 | | | Neg | Neg |
| 8 | | | Neg | Neg |

Such a future PoE standard could still allow for various cable types to be used or in any case an installer installing such a system could us a different cable type than prescribed by the standard if the cable type were prescribed in such a future standard. In Table 4 the pin configuration at the end of the PD is shown when a PD is connected to a PSE over respectively a straight type cable or a cross type cable.

TABLE 4

| Pin | Type 3 PSE | Type 3 PD (straight cable) | Type 3 PD (cross cable) |
| --- | --- | --- | --- |
| 1 | Neg | Neg | Pos |
| 2 | Neg | Neg | Pos |
| 3 | Pos | Pos | Neg |
| 4 | Pos | Pos | Pos |
| 5 | Pos | Pos | Pos |
| 6 | Pos | Pos | Neg |
| 7 | Neg | Neg | Neg |
| 8 | Neg | Neg | Neg |

Figure 5A:
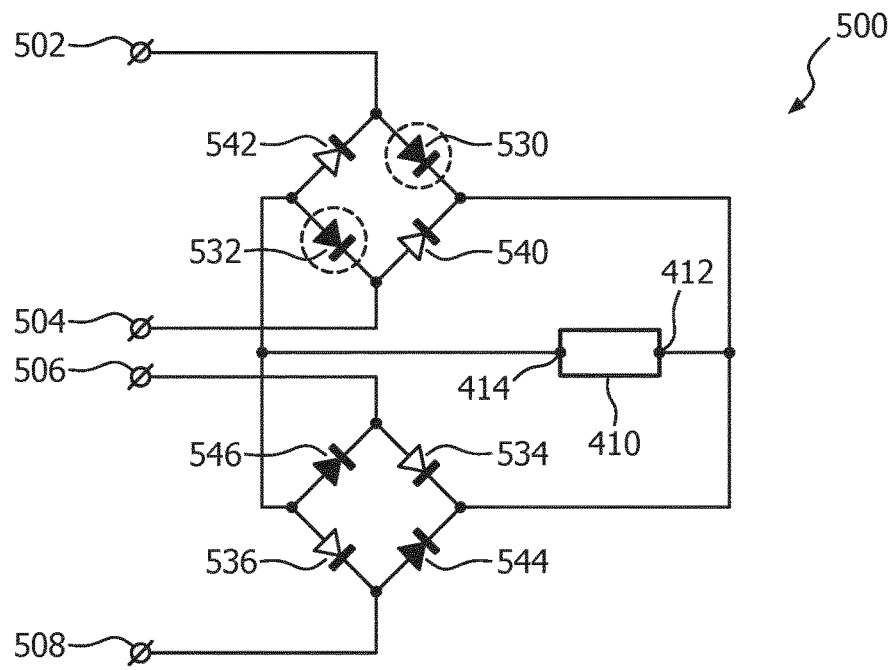
FIG. 5a and FIG. 5b show schematically and exemplarily the current flow through a first and second polarity correction circuit, respectively in a first and second polarity configuration of the current over the input.
Figure 5B:
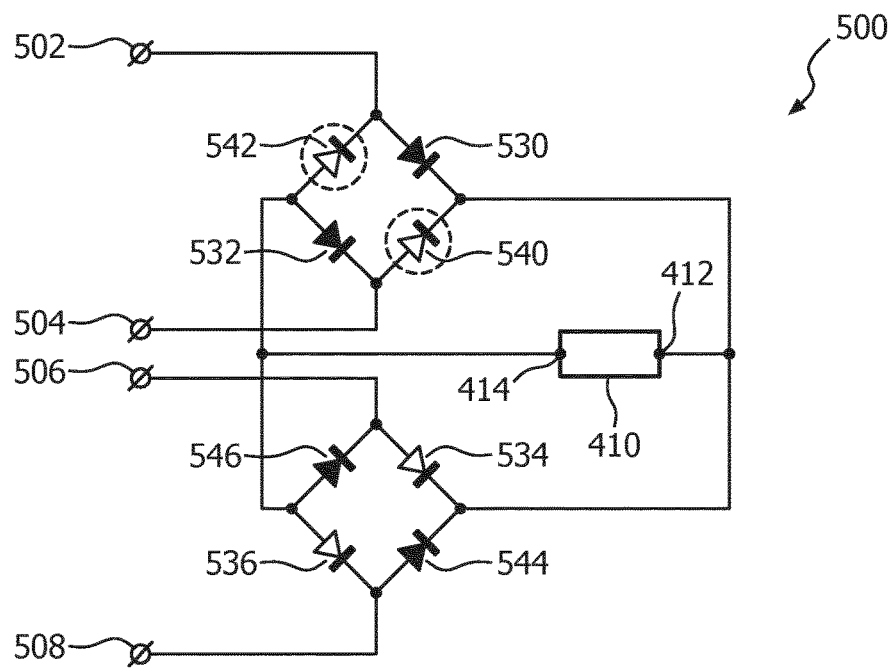

An example of an application of the polarity correction circuit to a PD is illustrated in FIGS. 5a and 5b, where two polarity correction circuits are each connected to four pins (of the jack that holds the Ethernet cable connected to the PSE). The circuit 500 comprises an input 502, 504, 506, 508 connected to pins 1 and 2, 3 and 6, 4 and 5; and 7 and 8 respectively. In this example, the PSE is of a Type 3 (i.e. pin 1 is Neg, pin 2 is Neg, pin 3 is Pos, pin 4 is Pos, pin 5 is Pos, pin 6 is Pos, pin 7 is Neg, pin 8 is Neg) and a straight type Ethernet cable is used to connect the PD to the PSE (i.e. the pin configuration at the end of the PD is the same as at the side of the PSE; pin 1 is Neg, pin 2 is Neg, pin 3 is Pos, pin 4 is Pos, pin 5 is Pos, pin 6 is Pos, pin 7 is Neg, pin 8 is Neg). In this circuit asymmetric conduction components 540, 542, 534, 536 are the (energy) efficient components (e.g. Schottky diodes) and asymmetric conduction components 530, 532, 544, 546 are the less (energy) efficient components (e.g. p-n junction diodes). The current path flows through the (energy) efficient components. If instead, as shown in FIG. 5b, a cross type cable is used (the pin configuration at the end of the PD is not the same as at the side of the PSE; at the side of the PD pin 1 is Pos, pin 2 is Pos, pin 3 is Neg, pin 4 is Pos, pin 5 is Pos, pin 6 is Neg, pin 7 is Neg, pin 8 is Neg) the current path flows through (energy) efficient components 534, 536 and less (energy) efficient components 530, 532.

Figure 6:
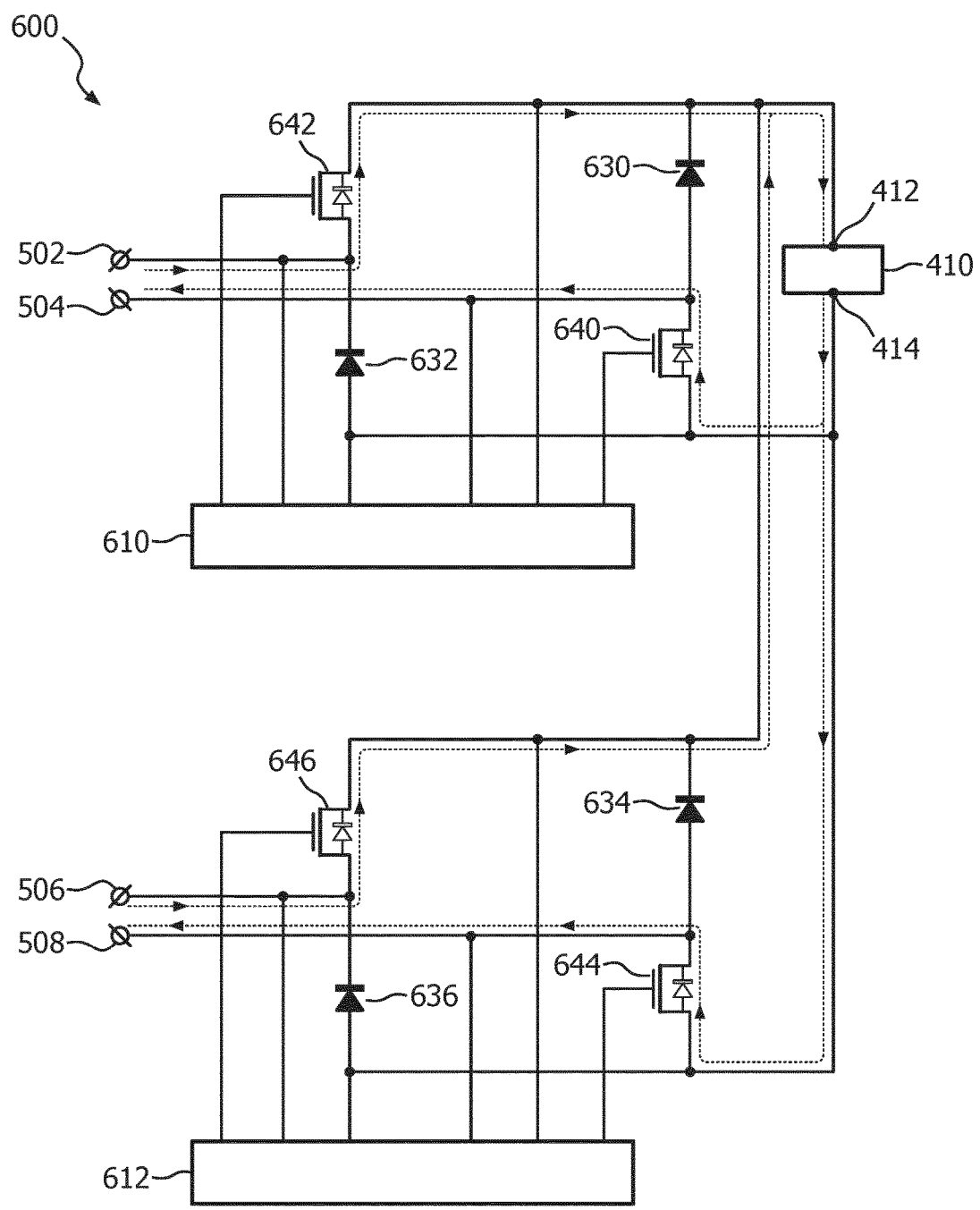
FIG. 6 shows schematically and exemplarily a Powered Device comprising a first and second polarity correction circuit.

FIG. 6 shows a circuit comparable to the circuit of FIG. 5a and FIG. 5b, yet instead of Schottky diodes, MOSFETs 640, 642, 644, 646 are used. Although the illustration shows that diodes are used as the less (energy) efficient component 630, 632, 634, 636, Schottky diodes could be used instead (the MOSFETs are more efficient than the Schottky diodes). The MOSFETs are controlled by a controller 610, 612 (shown as separate controllers, this can alternatively be a single controller).

Although the circuit as illustrated in FIGS. 5a and 5b as well as in FIG. 6 has the advantages of the polarity correction circuit according to the invention, the difference in (energy) losses over the (energy) efficient components versus the less (energy) efficient components in the situation where a cross type cable is used creates a power unbalance.

Figure 7:
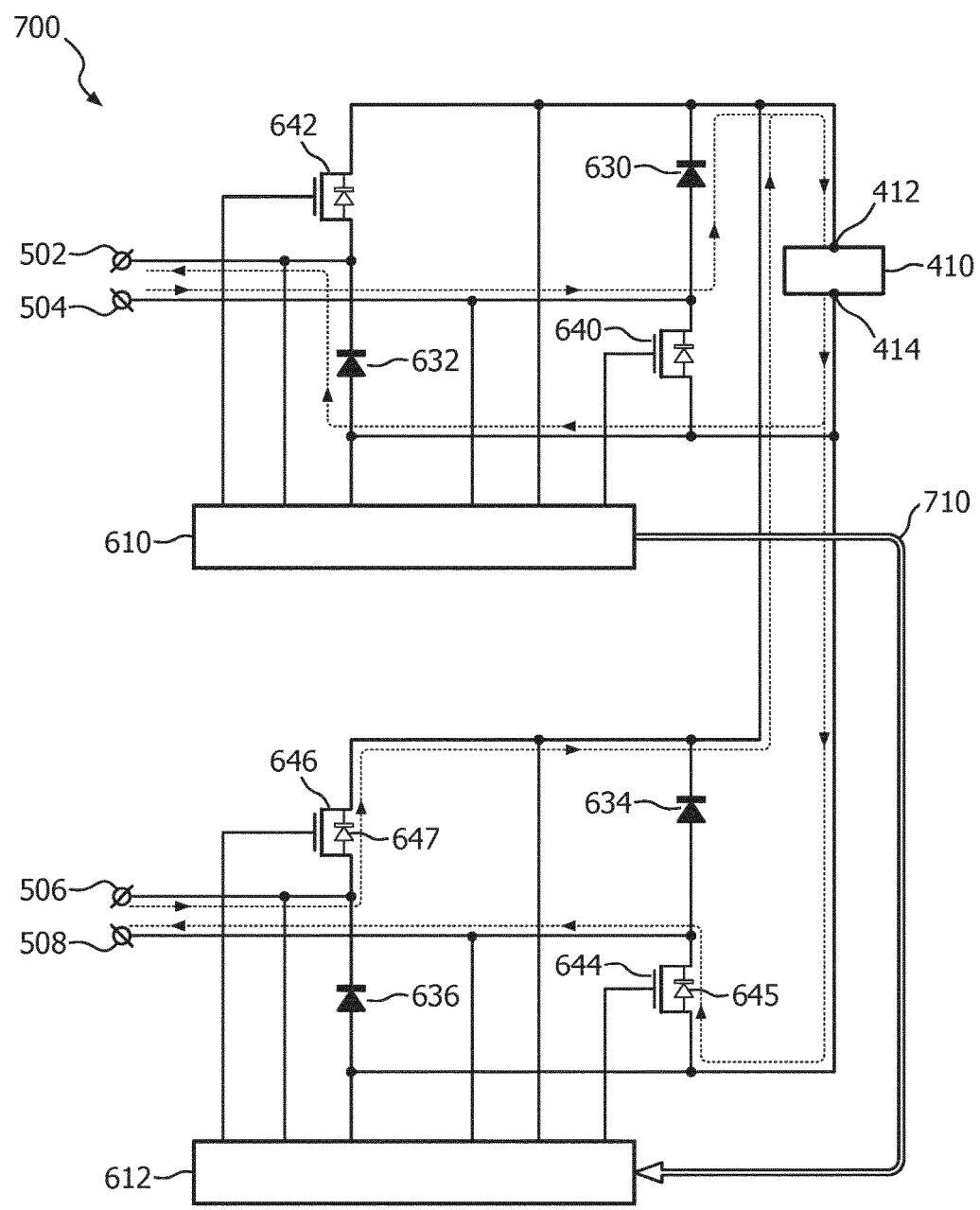
FIG. 7 shows schematically and exemplarily a Powered Device comprising a power unbalance mitigating polarity correction circuit according to the invention.

FIG. 7 resembles the circuit of FIG. 6, yet in this embodiment now the controller 610, 612 are able to control the MOSFETs such that a power unbalance mitigation mode when the current received by the first polarity correction circuit (top) is conducted over the first current path of the first polarity correction circuit and the current received by the second polarity correction (bottom) circuit is conducted over the second current path of the second polarity correction circuit. The controller 610 is able to communicate with controller 612 as indicated by line 710 (although the illustration shows two controllers, in a situation where the controller is a single component the part of the single component arranged for controlling MOSFETs 640, 642 would be arranged to control the part of the single component arranged for controlling MOSFETs 644, 646). In a situation where the current path in the first polarity correction circuit flows through the less (energy) efficient components, the controller 610 can signal this to the controller 612 such that controller 612 controls the MOSFETs 644, 646 such that these are effectively switched off and the current flows over the body diode of the MOSFETs, body diodes 645, 647 respectively. The voltage drop over the body diodes 645, 647 will more closely resemble those over diodes 630, 632 and as such the power unbalance will be (at least partially) mitigated.

Figure 8:
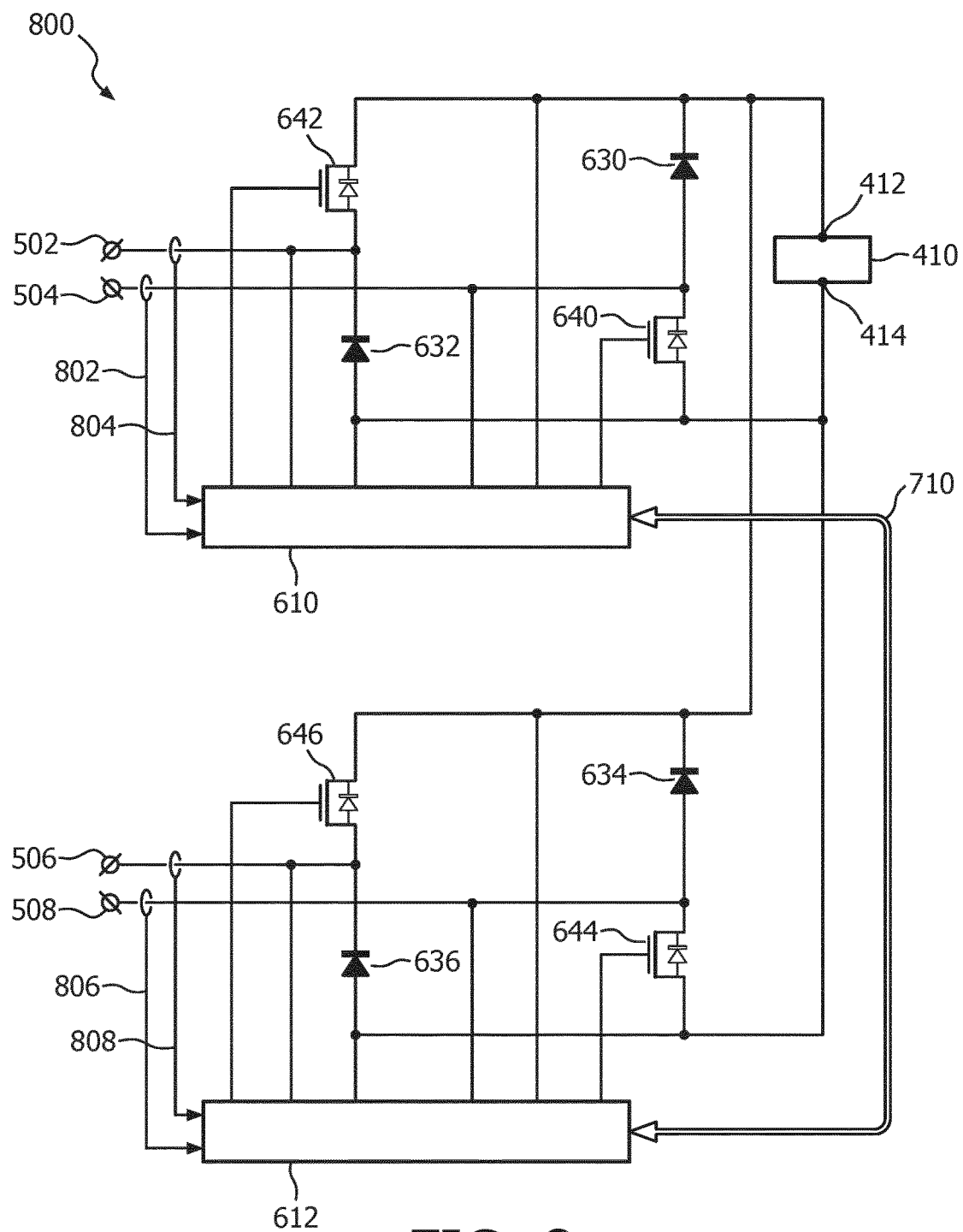
FIG. 8 shows schematically and exemplarily a Powered Device comprising a power unbalance mitigating polarity correction circuit according to the invention, wherein the power unbalance mitigation mode is activated only when the determined current level exceeds a predetermined threshold.

FIG. 8 resembles the circuit of FIG. 7, yet in this embodiment the current flow is measured using connections 802, 804, 806, 808 to the inputs 504, 502, 508, 506 respectively; and the controller 610, 612 can determine whether to control the MOSFETs in the power unbalance mitigation mode based on the current drawn. If the current level drawn is below a predetermined threshold, the power unbalance mitigation mode will not be used (e.g. when, due to the low current level drawn, the power unbalance does not raise any issues).

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A power unbalance mitigating polarity correction circuit comprising at least a first and a second polarity correction circuits, the first and the second polarity correction circuits each comprising:
an input for receiving an input current,
an output for providing a rectified output current,
at least a first current path, for conducting the received input current when the received input current is of a first polarity, and a second current path, for conducting the received input current when the received input current is of a second polarity, wherein the first current path comprises a passive rectification component as an asymmetric conductance component of a first type and the second current path comprises an active rectification component as an asymmetric conductance component of a second type different from the first type;
the power unbalance mitigating polarity correction circuit further comprising a controller, wherein the controller is arranged for controlling an active rectification component to operate in a power unbalance mitigation mode when the controller determines a power unbalance mitigation condition for mitigating an unbalance of power between the first polarity correction circuit and the second polarity correction circuit when the input current received by the first polarity correction circuit is conducted over the first current path of the first polarity correction circuit and the input current received by the second polarity correction circuit is conducted over the second current path of the second polarity correction circuit.

2. The power unbalance mitigating polarity correction circuit according to claim 1, wherein the asymmetric conductance component of the first type is a diode and the asymmetric conductance component of the second type is a MOSFET, and wherein during the power unbalance mitigation mode the controller controls the MOSFET such that current flows through the body diodes of the MOSFET in the second current path of the second polarity correction circuit.

3. The power unbalance mitigating polarity correction circuit according to claim 2, wherein the controller is further arranged for determining a power unbalance level and for controlling the MOSFET in the power unbalance mitigation mode when the determined power unbalance level exceeds a predetermined threshold.

4. The power unbalance mitigating polarity correction circuit according to claim 2, wherein the controller is further arranged for determining a current level drawn over the output and control the MOSFET in the power unbalance mitigation mode when the determined current level exceeds a predetermined threshold.

5. The power unbalance mitigating polarity correction circuit according to claim 2, wherein the controller is further arranged for controlling a channel resistance of the MOSFET.

6. A Power over Ethernet (PoE) compliant Powered Device (PD) comprising the power unbalance mitigating polarity correction circuit according to claim 1.

7. A PoE power distribution system comprising the PD of claim 6, further comprising a Power Sourcing Equipment (PSE) wherein the PSE is arranged for providing current, through a port, according to a predetermined polarity configuration.

8. A method performed by the controller in the power unbalance mitigating polarity correction circuit according to claim 1, the method comprising:
determining a polarity of the input current received over the input of the first polarity correction circuit,
determining a polarity of the input current received over the input of the second polarity correction circuit,
controlling the active rectification component of the second polarity correction circuit to operate in the power unbalance mitigation mode when the input current received over the input of the first polarity correction circuit is of a first polarity and the input current received over the input of the second polarity correction circuit is of a second polarity.

9. A power unbalance mitigating polarity correction circuit controller comprising:
a processor,
a memory, and
an interface arranged for interfacing with at least a first and a second polarity correction circuit, the first and second polarity correction circuits each comprising:
an input for receiving an input current,
an output for providing a rectified output current,
at least a first current path, for conducting the received input current when the received input current is of a first polarity, and
a second current path, for conducting the received input current when the received input current is of a second polarity,
wherein the controller is arranged to determine a power unbalance mitigation condition for mitigating an unbalance of power between the first polarity correction circuit and the second polarity correction circuit in a case where the input current received by the first polarity correction circuit is conducted over the first current path of the first polarity correction circuit and the input current received by the second polarity correction circuit is conducted over the second current path of the second polarity correction circuit.

* * * * *